United States Patent
Nendick

(10) Patent No.: US 6,975,264 B2
(45) Date of Patent: Dec. 13, 2005

(54) SIGNAL SEPARATING SYSTEM

(75) Inventor: Victor Nendick, Portsmouth (GB)

(73) Assignee: Astrium Limited, Hertfordshire (GB)

(*) Notice: Subject to any disclaimer, the term of this patent is extended or adjusted under 35 U.S.C. 154(b) by 0 days.

(21) Appl. No.: 10/486,091

(22) PCT Filed: Jul. 30, 2002

(86) PCT No.: PCT/GB02/03503

§ 371 (c)(1),
(2), (4) Date: Feb. 6, 2004

(87) PCT Pub. No.: WO03/014762

PCT Pub. Date: Feb. 20, 2003

(65) Prior Publication Data

US 2004/0198227 A1 Oct. 7, 2004

(30) Foreign Application Priority Data

Aug. 8, 2001 (GB) .............................................. 0120357

(51) Int. Cl.[7] .............................................. G01S 7/292
(52) U.S. Cl. ........................ 342/159; 342/13; 342/101; 342/137; 342/159; 342/162; 342/163; 342/175; 455/63.1; 455/106
(58) Field of Search ....................... 342/13, 21, 89–91, 342/98–101, 137, 159–163, 175, 195, 198; 455/63.1, 106

(56) References Cited

U.S. PATENT DOCUMENTS

| 4,398,196 A | * | 8/1983 | Wiegand | 342/192 |
|---|---|---|---|---|
| 4,614,919 A | * | 9/1986 | Floyd | 333/133 |
| 4,675,682 A | * | 6/1987 | Adam et al. | 342/375 |
| 4,730,189 A | * | 3/1988 | Siegel et al. | 342/104 |

(Continued)

FOREIGN PATENT DOCUMENTS

| EP | 0 440 920 A | 8/1991 | | |
|---|---|---|---|---|
| EP | 440920 A2 | * | 8/1991 | .......... H03H/11/12 |
| EP | 0 570 166 A | 11/1993 | | |
| GB | 2 274 752 A | 8/1994 | | |
| GB | 2 308 034 | 5/1997 | | |
| GB | 2 350 986 A | 12/2000 | | |
| GB | 2 362 075 A | 11/2001 | | |

OTHER PUBLICATIONS

"A frequency agile X–band homodyne GaAs MMIC transceiver with a synthesized phase locked source for automotive collision avoidance radar", Woo, C et al.;Microwave and Mm–Wave Monolithic Circuits Symposium, 1994.Digest of Papers, IEEE, 22–25 May Ps:129–132.*

"A frequency agile X–band homodyne GaAs MMIC transceiver with a synthesized phase locked source for automotive collision avoidance rader", Woo et al, Proc's of 1994 IEEE Microwave and Mm–Wave Monolithic Circuits Symposium, San Diego, CA, USA, May, 22–25 1994.*

"Extra noise and methods to repress it in agile radar", Luan et al, Acta–Electronica–Sinica (China), vol. 16, No. 1, p. 98–102, Jan. 1988.*

Primary Examiner—John B. Sotomayor
(74) Attorney, Agent, or Firm—Crowell & Moring LLP

(57) ABSTRACT

A signal separating system 1 comprises a frequency conversion element 3, a dynamic filter component 4 with associated coherent stop slot and non-coherent passband, optionally a signal wave enhancer 7 with bypass, and a frequency reconversion element 8. In operation of the system, mixed incoming signals 12 (CW or pulse signals) having known interference and unknown emission components can be effectively separated, permitting a virtually instantaneous separation of the known interference from the unknown emissions and permitting an unobscured monitoring and/or characterization of the extracted unknown emissions 21, if desired. The arrangement bears definite advantage over known arrangements and retains utility for various frequency/agile or multiple or non-agile unknown signal applications.

18 Claims, 9 Drawing Sheets

U.S. PATENT DOCUMENTS

| | | | | |
|---|---|---|---|---|
| 4,780,667 A | * | 10/1988 | Reese et al. | 324/76.79 |
| 5,404,144 A | * | 4/1995 | Vlannes | 342/13 |
| 5,955,987 A | * | 9/1999 | Murphy et al. | 342/357.06 |
| 6,215,812 B1 | | 4/2001 | Bongfeldt | |
| 6,369,772 B1 | * | 4/2002 | Forster | 455/106 |
| 6,456,225 B1 | * | 9/2002 | Forster | 342/12 |
| 2002/0061081 A1 | * | 5/2002 | Richards et al. | 375/346 |
| 2004/0198227 A1 | * | 10/2004 | Nendick | 455/63.1 |

* cited by examiner

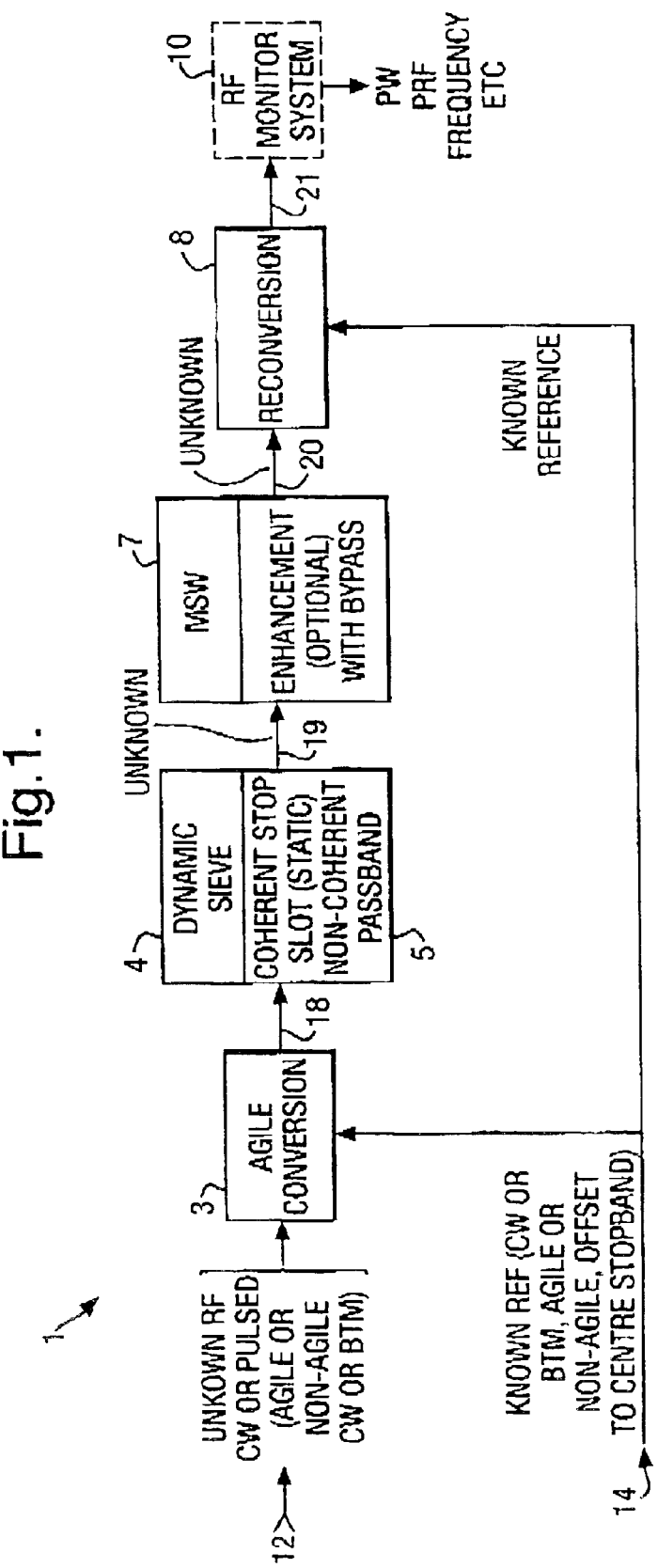

Fig.2.

Stage 1 Initial Conditions

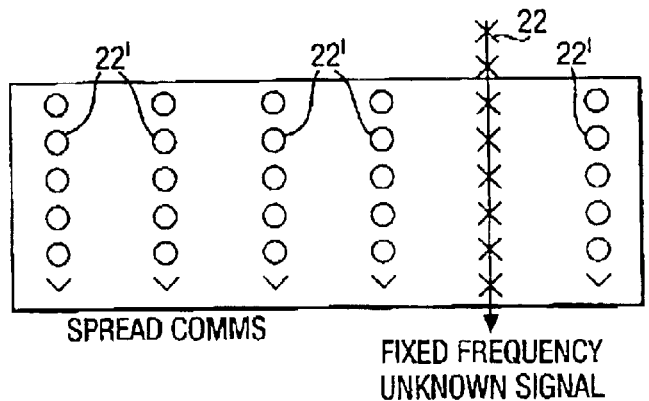

SPREAD COMMS     FIXED FREQUENCY UNKNOWN SIGNAL

Stage 2 Despread Comms
Spread Unknown
Signal

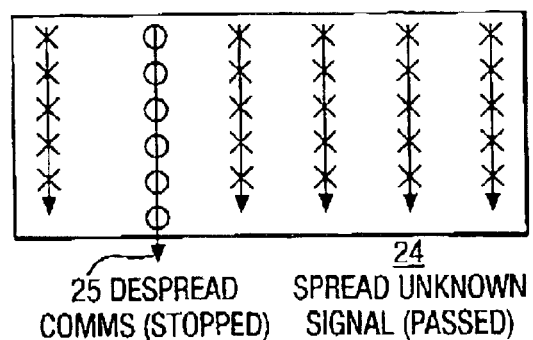

25 DESPREAD COMMS (STOPPED)     24 SPREAD UNKNOWN SIGNAL (PASSED)

Stage 3 Fixed Narrowband Stop Filter

Stop Comms
Pass Unknown Spread
Signal

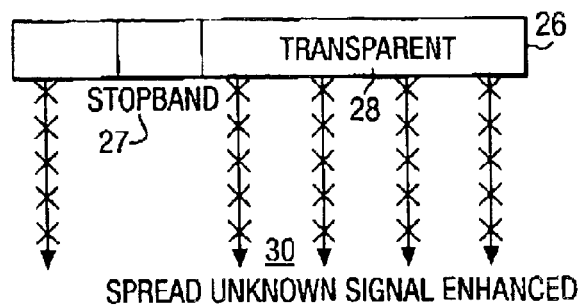

SPREAD UNKNOWN SIGNAL ENHANCED

Stage 4 S/N Enhancement

Stage 5 Despread Radar

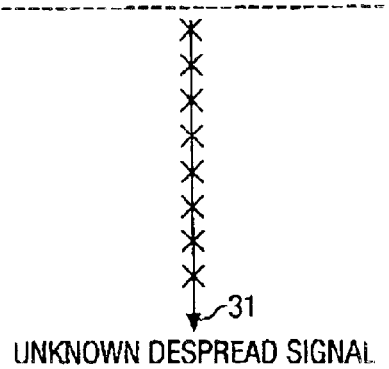

UNKNOWN DESPREAD SIGNAL

Stage 6 Monitor System

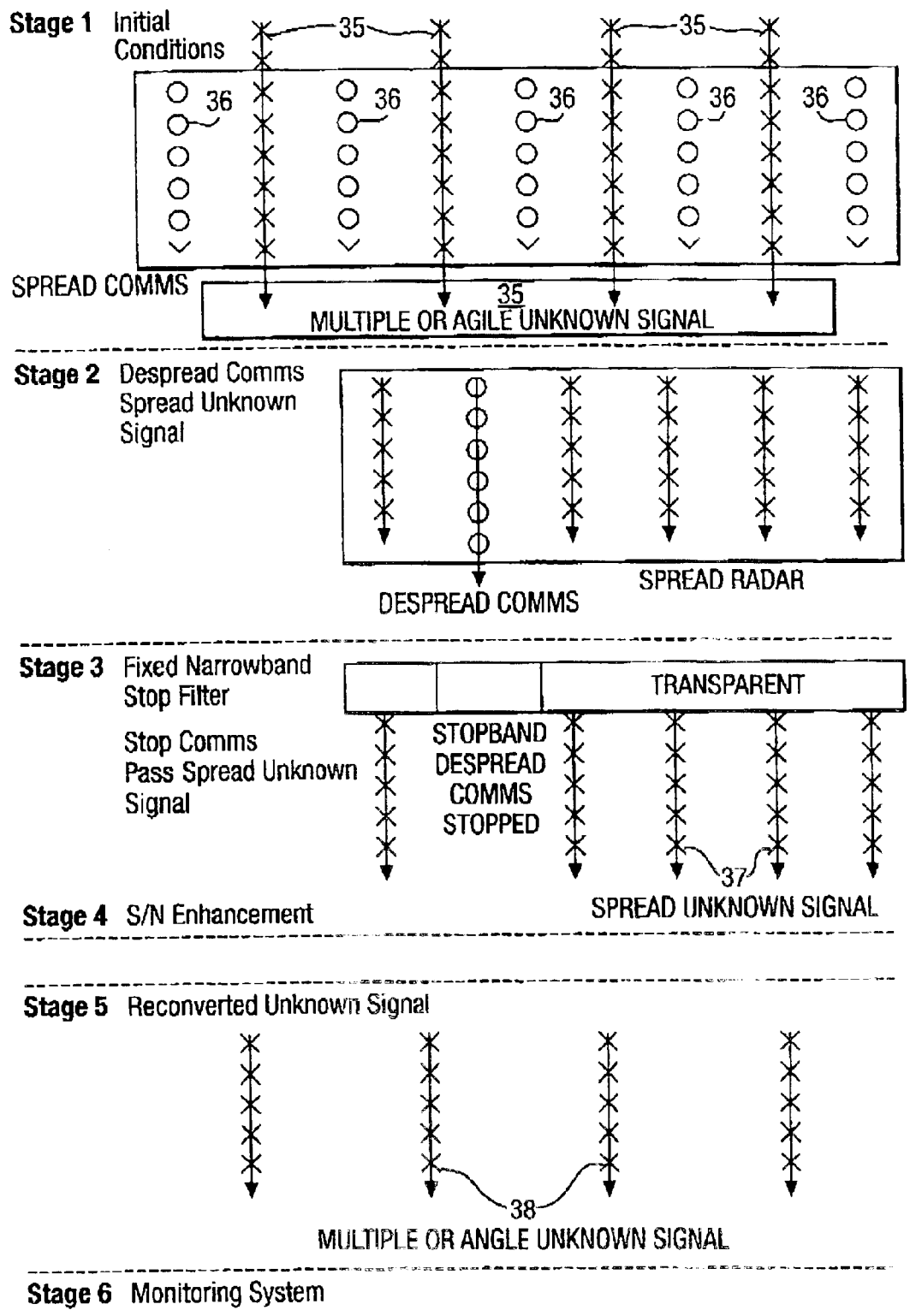

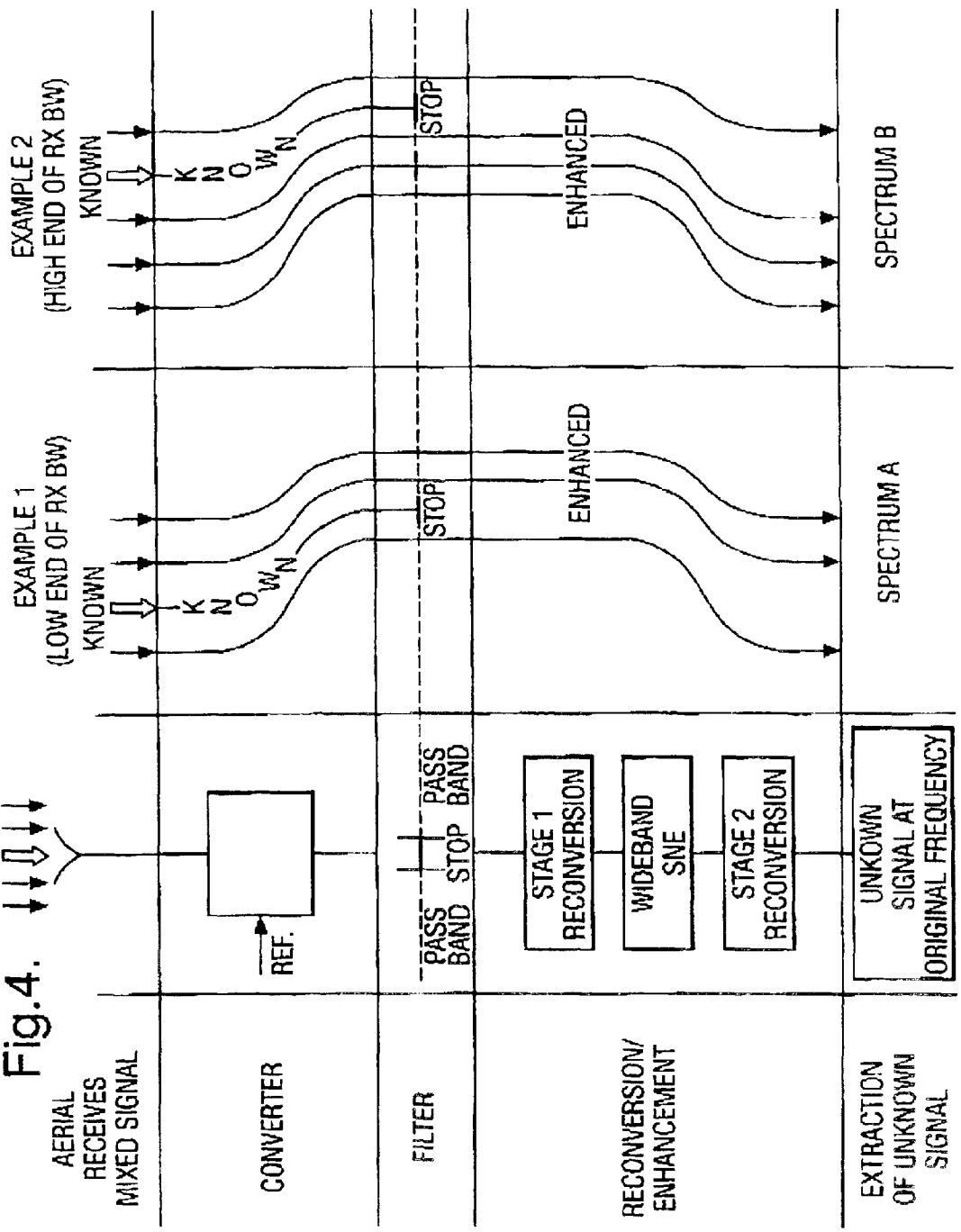

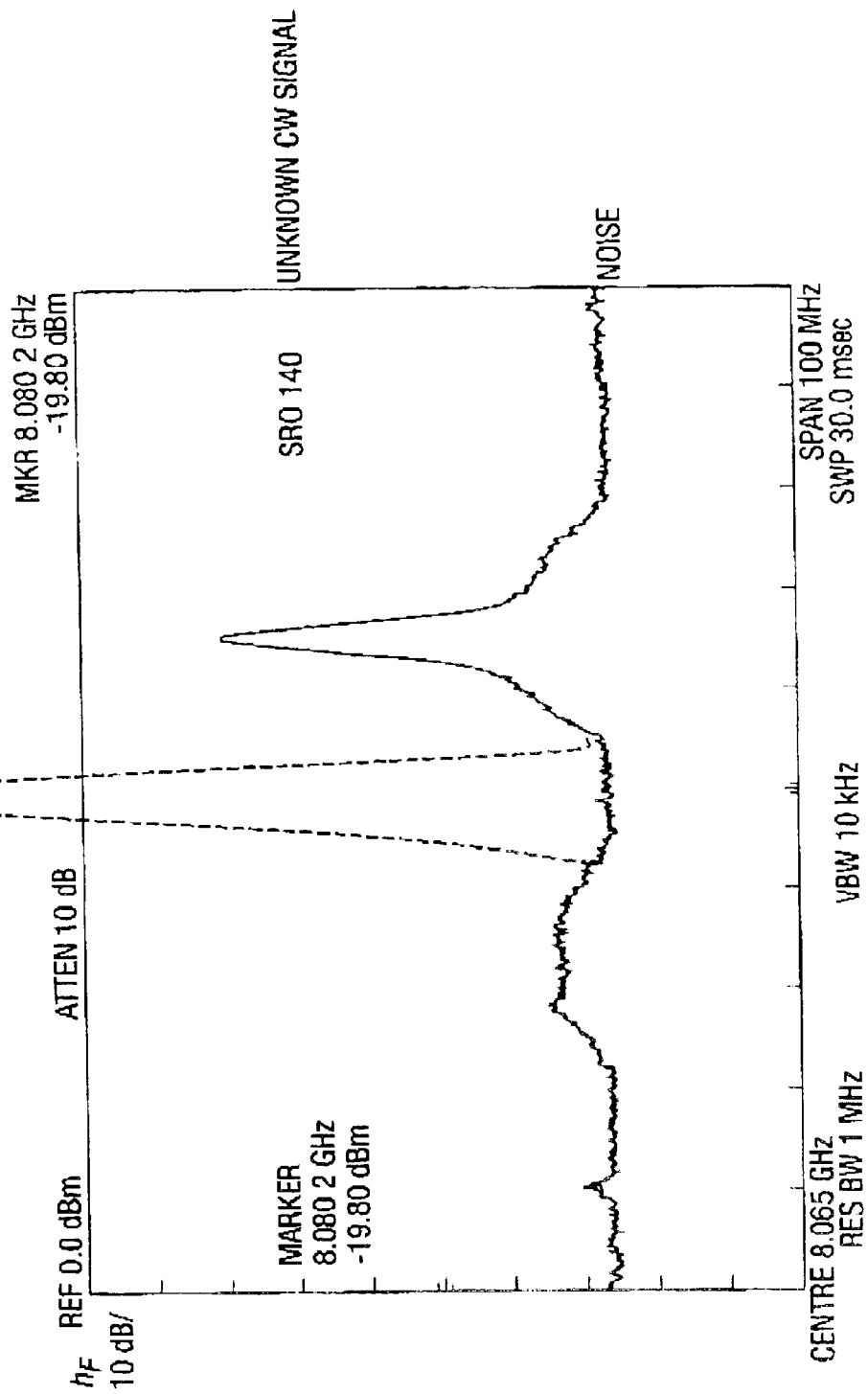

Interference -45 dBm. Pulse Radar -70 dBm.
Gain Attenuation 28 dB. PRF 500 Hz.
Pulsewidth 0.1 microsecs. No SNE Interference -45 dBm. Pulse Radar -70 dBm.
Gain Attenuation 28 dB. PRF 500 Hz.
Pulsewidth 0.5 microsecs. No SNE

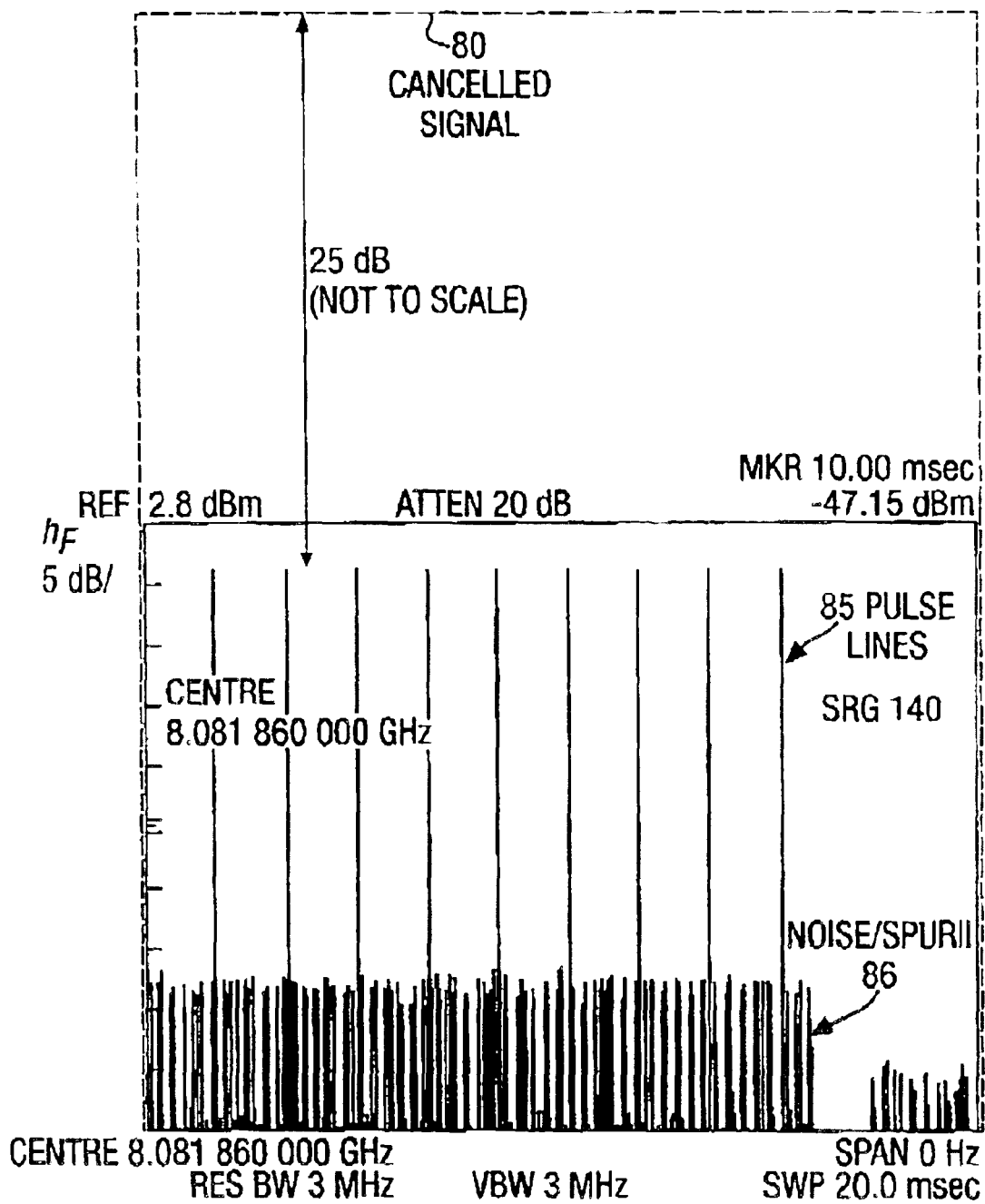

SIGNAL SEPARATING SYSTEM

FIELD OF THE INVENTION

The present invention relates to a signal separating system and more particularly, but not exclusively, concerns a signal separating method and apparatus for separating known transmission interference from unknown radar signal emissions.

BACKGROUND OF THE INVENTION

Monitoring unknown pulsed emissions or continuous wave (CW) emissions is difficult in the presence of high level CW emissions in the monitored bandwidth. Pulsed emission monitoring in the presence of pulsed interference can be overcome using established pulse on pulse extraction techniques but CW high level interference tends to mask unknown low level pulses within the monitored bandwidth. In the past, static or adaptive filters have been used to remove CW interference, creating blind spots in the monitored bandwidth. Further, adaptive filters, for example adaptive YIG filters, have settling times which can be too slow to remove fast agile signal emissions such as very fast frequency hopped CW wideband communications emissions and are not readily adaptable to remove multiple CW spread spectrum interfering emissions.

OBJECTS AND SUMMARY OF THE INVENTION

The present invention aims to overcome or at least substantially reduce some of the above-mentioned drawbacks.

It is an object of the present invention to provide an improved signal separating system which has a virtually zero settling time response, which is unaffected by multipath effects/amplitude variations and which has the capability of instantly separating known transmission interference from unknown signal emissions, for example radar signal emissions, and of monitoring and optionally enhancing the unknown signal emission characteristics within the same bandwidth as the known own emissions without interference.

It is another object of the present invention to provide a signal separating system with novel real-time frequency agile filter means, enabling an enhancement in the system's capability of measuring/sensing received signal emissions.

In broad terms, the present invention resides in the concept of using instantaneous frequency agile adaptive conversion as means to frequency convert an incident mixed signal and controllably transmitting through a predetermined filter region an incoherent signal component of the frequency converted signal representative of an unknown signal emission and instantaneously reconverting the extracted unknown signal emission to its original frequency, enabling the unknown signal emission characteristics to be measured and monitored without the unwanted transmission interference effects.

According to one aspect of the present invention, there is provided a method of separating an unknown signal emission from a known interference signal in a system incorporating frequency filter means with controllable frequency converting means, the method comprising the steps of:

(a) receiving and frequency converting a mixed signal at the frequency converting means, which mixed signal comprises a first signal component representative of the unknown signal emission and a second signal component representative of the known interference signal, the first signal component having a single frequency or a plurality of frequencies associated herewith;

(b) stopping a coherent signal component representative of the second signal component at a selected frequency stopband region associated with the frequency filter means;

(c) transmitting an incoherent signal component representative of the received first signal component through a selected frequency-transparent region associated with the frequency filter means; and (d) reconverting the transmitted incoherent signal component with reference to a predetermined signal so as to restore the unknown signal emission at its said single frequency/said plurality of frequencies.

According to another aspect of the present invention, there is provided a signal separating system for separating an unknown signal emission from a known interference signal, the system comprising:

means for receiving and frequency converting a mixed signal, which mixed signal comprises a first signal component representative of the unknown signal emission and a second signal component representative of the known interference signal, the first signal component having a single frequency or a plurality of frequencies associated herewith;

means for stopping a coherent signal component representative of the second signal component at a selected frequency stopband region of the system;

means for transmitting an incoherent signal component representative of the first signal component through a selected frequency-transparent region of the system; and means for reconverting the transmitted incoherent signal component with reference to a predetermined signal so as to restore the unknown signal emission at its said single frequency/said plurality of frequencies.

In accordance with several exemplary embodiments of the invention which will be described hereinafter in detail, the signal separating system uses instantaneous agile adaptive conversion to diffuse incoherent signal emissions through transparent regions of a static filter and removes coherent emissions directed into a static narrow stop slot, having virtually no settling time and instantly separating known unwanted interference effects from unknown (for example, radar) signal emissions. Further, by removing known coherent emissions, diffused unknown emissions can be separated and instantaneously reconverted to their original frequency, allowing the unknown signal emissions characteristics to be monitored effectively without interference and providing a proper signal characterisation if desired, (a PW/PRF/frequency characterisation for example).

Advantageously, the provision of instantaneous agile frequency conversion allows (a) signal rejection to be performed at a particular frequency enabling narrow coherent frequency slots to be deployed, and (b) signal transmission to be effected at a particular frequency for signal to noise enhancement, if required. This increases measurement sensitivity of the signal separating system of the invention, typically by 30 dB for low level pulse monitoring.

Advantageously the incident mixed signal can be effectively separated at a number of different frequencies using a number of agile frequency converters. The mixed signal may comprise a continuous or pulsed wave signal, for example a signal in the radio frequency range.

Conveniently, the signal to noise level of the transmitted incoherent signal component can be enhanced. For example, the dynamic range of the transmitted incoherent signal component can be enhanced by means of signal compression or signal logarithmic amplification. Further, the transmitted incoherent signal component can be enhanced at a predetermined frequency by use of a magnetostatic wave (MSW) enhancer, permitting the threshold sensitivity of the system to be optimised/enhanced and permitting the suppression of unwanted noise and spurii.

To achieve signal enhancement using a magnetostatic wave enhancer (MSW), it is envisaged that a Gadolinium Gallium Garnet substrate device is used in the system of the invention. Alternatively, any device having similar characteristics to that of Gadolinium Gallium Garnet substrate could be deployed for MSW signal enhancement in the invention.

It is noted that the signal to noise enhancement can be advantageously carried out at different frequencies using additional frequency converters, if desired.

Conveniently, the signal separating system of the invention can be used to monitor both narrow pulses (100 ns pulsewidth typically) and broad pulses in the presence of CW emissions typically greater that 40 dB above the pulse levels, without creating blind spots for agile CW interference. Also, the components of the signal separating system can be deployed in parallel or serial combinations to remove multiple CW interference from known emitters, thus permitting signal monitoring in conditions not readily achievable previously without blind spots.

It is appreciated that the signal separating system of the invention finds utility in multiple, in frequency agile and in non-agile unknown signal applications. In frequency agile applications, for example, the frequency stopband region can be conveniently modified to permit stopping of the coherent signal component at a particular (normally low) frequency. Preferably, the frequency filter component is maintained stationary, enabling the frequency filtering of signals to be instantaneous with virtually zero settling time.

Having regard to the foregoing, the signal separating system of the invention has enhanced performance over known systems and it can provide interference rejection typically greater than 70 dB and signal enhancement typically up to a 30 dB level. Instantaneous reception of unknown pulses at levels typically down to −90 dBm with 100 ns pulsewidths can be achieved in the presence of input communication interference levels greater than 40 dB, typically, above the pulse in the same band. Also, the system of the invention can (a) provide radiation monitoring in the same bandwidth without frequency obstruction for FHSS (agile) communications interference and (b) reduce or minimise the frequency obstruction when deployed with non-agile communications.

Further the system of the invention can conveniently provide for unknown signal monitoring without the use of special known signal waveforms which could otherwise indicate the known signal emitter's tactical role and identity.

Further, signal separation in the system of the invention can be effectively carried out with pulse or CW unknown and known signal combinations using modulated or unmodulated signals.

The above and further features of the invention are set forth with particularity in the appended claims and will be described hereinafter with reference to the accompanying drawings.

BRIEF DESCRIPTION OF THE DRAWINGS

FIG. 1 is a block schematic of a signal separating apparatus embodying the present invention;

FIG. 2 to 4 are schematics of a signal separation process embodying the invention for fixed frequency unknown signals and for multiple or agile unknown signals;

FIG. 7 shows typical signal reception characteristics of a signal separating system embodying the invention;

FIG. 9 shows typical spectra characteristics of a signal separating system embodying the invention.

DETAILED DESCRIPTION OF EXEMPLARY EMBODIMENTS

Figure 5:
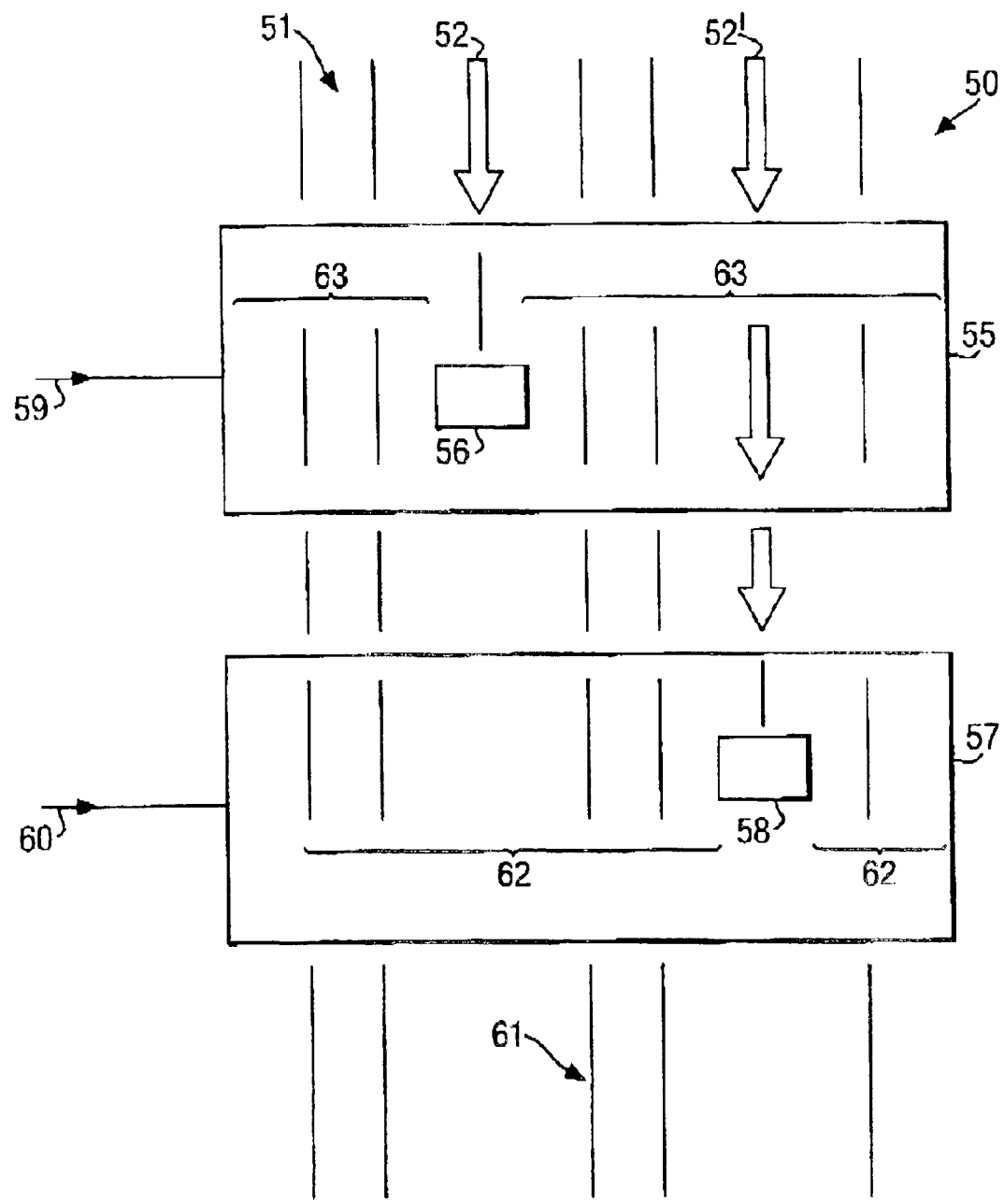
FIG. 5 is a schematic of a cascaded filter arrangement in an embodiment of the invention.

In this specification, the term "frequency agile" is taken to mean or cover any form of signal which can move across the frequency band by changing its frequency.

Referring first to FIG. 1, there is schematically shown a preferred signal separating apparatus 1 embodying the present invention. The signal separating apparatus 1 comprises an agile frequency conversion element 3, a frequency filter 4 with an associated coherent frequency stop slot 5 and non-coherent frequency passband 5, a magnetostatic wave (MSW) enhancer 7 with bypass and a frequency reconversion element 8.

As shown in FIG. 1, the agile frequency conversion element 3 receives and combines at is input side (i) an incident mixed signal 12 comprising known and unknown signal components and (ii) a known control reference signal 14. The input signal is frequency converted by the conversion element 3 and the resultant frequency converted signal 18 is output to the connecting frequency filter 4. The frequency filter 4 has a high rejection narrowband coherent stop slot (static) 5 and a non-coherent frequency passband 5, so that the known coherent part of the frequency converted signal is blocked by the stop slot 5 at a selected frequency, and the unknown incoherent part of the frequency converted signal is transmitted and diffused through the selected frequency passband 5. The diffused incoherent (unknown) signal 19 is preferably received by the connecting magnetostatic wave (MSW) enhancer 7, with bypass, for providing signal to noise enhancement and the resultant enhanced (unknown) signal 20, together with the known control reference signal 14, are controllably fed into the input side of the connecting frequency reconversion element 8 so that the unknown signal is frequency converted by the reconversion element 8 back to its original incident frequency. The frequency reconversion step is effected by performing a comparison between the unknown signal characteristic 20 and the known control reference signal 14.

Thereafter, as shown in the Figure, the restored unknown signal emission 21 can be effectively monitored in real time by an external monitor system 10 if desired, permitting an in-depth characterisation of the unknown signal emission 21 if required.

In operation of the thus described signal separating apparatus, it will be understood that the MSW enhancement stage is optional, this being optionally deployed at a selected frequency using a Gadolinium Gallium Garnet substrate device or like device having similar characteristics. Also, while the components in the described embodiment are showing to be separate units, it is possible that the components could be formed as an integral unit.

Referring now to FIG. 2, this shows in schematic form the various stages of the known/unknown signal separation process according to one embodiment of the present invention as applied to incident mixed signals having a fixed frequency unknown signal component.

In FIG. 2, there is shown an incident mixed signal for use in the invention which has a fixed frequency unknown signal component 22 and a spread frequency known signal component 22' (stage 1). The mixed signal is frequency converted and the result is to (i) spread the unknown signal component into a number of unknown signals 24 over a range of frequencies and (ii) despread the known signal component so as to produce a known coherent signal 25 within a narrow frequency band (stage 2). As shown, the resultant signal is subject to a dynamic frequency filter 26 (stage 3), the known coherent signal being blocked by the selected stopband region 27 of the filter and the unknown signals being allowed to pass/diffuse through the transparent frequency bands 28 of the filter. The diffused incoherent unknown signals 30 can be (optionally) signal enhanced (stage 4) and thereafter, as shown, the unknown signals are frequency reconverted back to their original incident frequency 31 (stage 5). It is therefore an important feature of the present invention that the frequency reconversion provides a way of reversing the original frequency conversion by restoring unknown despread signals to their original frequency. As shown, the resultant extracted unknown signal 31 can be monitored in real time by a monitor system (stage 6).

Referring to FIG. 3, this shows in schematic form the various stages of the known/unknown signal separation process according to another embodiment of the invention as applied to incident mixed signals having multiple or agile frequency unknown signal components. In the following description, however, only the differences between the process of FIG. 3 and the previously described process of FIG. 2 are described.

In FIG. 3, the incident mixed signal has multiple or agile frequency unknown signal components 35 and a spread frequency known signal component 36 (stage 1). The mixed signal is frequency converted, filtered and enhanced (stages 2 to 4) and the result is the same as described previously in the FIG. 2 embodiment. As shown, the resultant spread (enhanced) unknown signals 37 are frequency reconverted, enabling the multiple or agile frequency unknown signals to be restored to their original frequency 38 (stage 5) and to be monitored if desired (stage 6).

FIG. 4 shows how particular frequency spectra of an incident known/unknown signal, which is to be separated, are formed during the above described separation process and how there is a correspondence between the generated spectra and the various stages of the above described signal separation process.

More particularly, as shown in frequency spectrum A of FIG. 4, an incident single carrier signal with a low rf frequency is received by an aerial and the received signal is frequency converted by an adaptive converter to produce a spread unknown signal over a range of frequencies and a despread known coherent signal within a specifically narrow low frequency band. As shown, the adaptive converter is controlled from a coherent sample which provides a known reference signal, and, in turn, this mode of signal control is used to direct the known coherent own transmissions into the fixed low frequency narrowband stop region of the frequency filter and to diffuse the spread incoherent unknown signals through the transparent frequency bands of the frequency filter. As shown, the resultant signal is preferably frequency reconverted via a two-stage reconversion process, there being incorporated an additional intermediate wideband signal to noise enhancement stage to reduce the effects of unwanted noise and spurii in the invention. The result is to provide an extracted unknown signal only at its original frequency.

Further, as shown in frequency spectrum B of FIG. 4, an incident single carrier signal with high rf frequency is shown, the only difference between the signal spectrum B and the signal spectrum A, as previously described, being that the location of the filter stop band is modified so as to be at a predetermined high rf frequency rather than a low rf frequency, enabling the known coherent signal component to be stopped at a predetermined high, rather than low, frequency.

FIG. 5 illustrates how a cascaded filter arrangement 50 of simple design is preferably used in the signal separating system of the invention in order to remove extraneous known signals 52, 52' multi-carrier known signals for example, from the system.

In FIG. 5, there is shown an incident mixed signal 51,52,52' comprising a spread unknown signal 51 and, by way of example, two extraneous despread known signals 52 52' having first and second frequencies. As shown, the incident signal 51,52,52' is subject to a cascaded, serial-type filter arrangement 50 comprising a first frequency filter 55 with an associated selected narrowband stop 56 at said first frequency and a second frequency filter 57 with an associated selected narrowband stop 58 at said second frequency. As is also shown, known control reference signals 59,60 are fed into the first and second frequency filters. It is to be appreciated that the number of filters to be used in the cascaded arrangement 50 could be easily varied in dependence upon the variable number of identified extraneous known signals, and that a simple cascaded parallel-type arrangement could be alternatively used instead of the above described serial-type arrangement.

In operation of the cascaded serial-type arrangement, therefore, the incident signal 51, 52, 52' is frequency converted (not shown in FIG. 5) and thereafter, the resultant converted signal is subject to the first frequency filter 55 so that the known signal 52 having the first frequency is blocked by the first filter stop 56 and the remaining part of the signal is allowed to pass through the transparent frequency bands 63 of the filter. As shown, the transmitted signal is then subject to the second frequency filter 57 so that the remaining known signal 52' having the second frequency is blocked by the second filter stop 58 and the unknown signal 61 is allowed to pass through the filter's transparent frequency band 62 for subsequent signal enhancement, frequency reconversion and, if desired, monitoring.

Figure 6A:
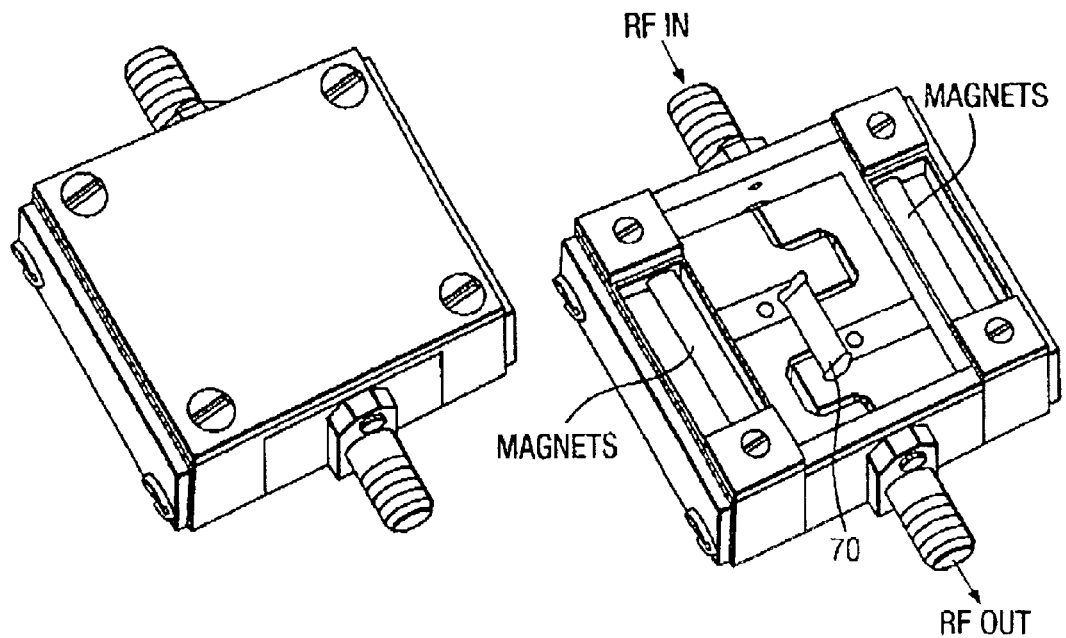
FIG. 6(a) shows an external view and an internal view of a magnetostatic wave (MSW) substrate device enhancer for use in the invention.

FIG. 6(a) shows an external view and an internal view of a magnetostatic wave (MSW) substrate device enhancer 70 for use in the system of the invention. The device enhancer 70, which is well-suited to various signal to noise enhancement applications, is designed to operate in a magnetic field.

As previously described, the signal separation process of the invention, as applied to both frequency/agile and non-agile unknown signals, optionally entails the deployment of signal to noise enhancement at an optimum/selected frequency using an MSW device enhancer of the kind shown in the Figure, enabling the threshold sensitivity of the system of the invention to be enhanced or optimised.

Preferably, the MSW device(s) to be used in the invention are formed of Gadolinium Gallium Garnet substrate material, although any device material with similar characteristics could be alternatively deployed. Also, it is to be noted that wideband signal to noise enhancement (over 0.6 to 1 GHz frequency range, typically) is made possible in the system of the invention by use of the MSW device(s), enabling narrow signal pulses to be transmitted and reducing adaptive converter spurii and noise such as to enhance signal sensitivity of the system.

Conveniently, signal separation and signal enhancement in the invention can be effected at a number of different selected frequencies using a combination of frequency converters and MSW device enhancers.

Figure 6B:
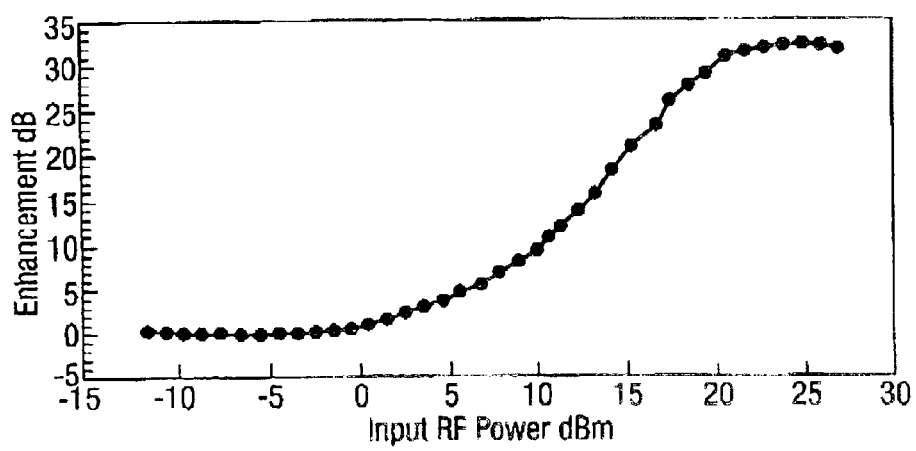
FIG. 6(b) shows typical signal enhancement characteristics of the device enhancer of FIG. 6(a)

FIG. 6(b) shows some typical signal to noise enhancement characteristics of the MSW device enhancer of FIG. 6(a). As shown, the signal enhancement level progressively increases, typically, as the input rf power to the MSW device is allowed to increase over the range 0 to 25 dBm and it is to be noted that the signal to noise enhancement level typically reaches a saturation level at around 32 dB corresponding to an input rf power of around 25 dBm.

FIG. 7 illustrates typical signal reception characteristics of a signal separating system embodying the present invention. As shown, an unknown CW signal of −70 dBm with CW known interference of −45 dBm in the same received bandwidth is received by the system and thereafter, in accordance with the above described separation process of the invention, the known own signal is cancelled and the desired unknown signal component is extracted and signal enhanced. Note that both CW and pulsed unknown/known signal combinations, using modulated or unmodulated signals, can be effectively separated using the system of the invention.

Figure 8A:
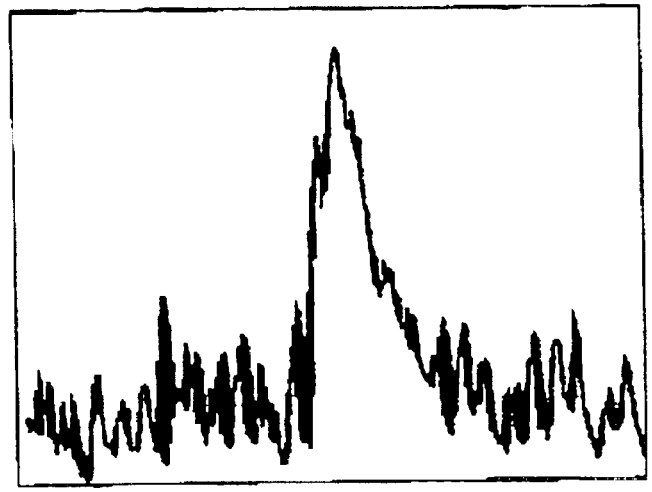
FIGS. 8(a) and 8(b) show some further typical signal reception characteristics of a signal separating system embodying the invention.
Figure 8B:

FIGS. 8(a) and 8(b) illustrate some more typical signal reception characteristics of a signal separating system embodying the present invention. In the figures, there is shown a −70 dBm pulse radar signal with (a) 0.1 micro seconds pulsewidth (no signal to noise enhancement) and (b) 0.5 microseconds pulsewidth (no signal to noise enhancement), the signals being extracted from incident known/unknown signals in accordance with the signal separating process of the invention, after cancellation of a −45 dBm known interference signal (not shown) within the same receiver bandwidth.

FIG. 9 illustrates some typical spectra characteristics of a signal separating system embodying the present invention. In the Figure, there is shown a pulse spectrum 85 representative of an extracted −70 dBm radar pulse signal (signal enhanced) which has been separated from an incident known/unknown signal in accordance with the signal separating process of the invention, after cancellation of a −45 dBm FHSS (Frequency hop spread spectrum) known interference CW communication signal 80 occupying the same bandwidth as the radar signal. The level of the noise/spurii background 86 is shown. As shown, the known CW spectrum 80 (dashed line) representative of the cancelled signal exceeds the pulse level by 25 dB (Figure not to scale) and it is to be noted that the known spectrum 80 is superimposed onto the extracted radar pulse spectrum 85 for the sake of comparison.

Having thus described the present invention by reference to various embodiments, it is to be well understood that the embodiments in question are exemplary only and that modifications and variations as will occur to those possessed of the appropriate knowledge and skills may be made without departure from the spirit and scope of the invention as set forth in the appended claims and equivalents thereof. For example, different kinds of signal having different shapes/waveforms, amplitudes and/or bandwidths can be received and separated by the system of the invention. Note that pulse or CW unknown and known signal combinations using modulated or unmodulated signals can be separated. In addition, the above described signal enhancement stage is optional in so far as it is not an essential feature to the invention and it is to be noted that the system of the invention does not exclude the use of signal compression, signal logarithmic amplification and/or signal limiting to provide an enhancement of the signal dynamic (power) range, if desired. Further, the respective various stages in the system of the invention, as described, can be varied in their order and/or number to provide the same or similar technical effect; for example, the extracted unknown signal could be frequency reconverted via a multistage frequency reconversion process with or without signal to noise enhancement, if desired. Also, additional frequency converters could be deployed in the system to provide filtering and/or signal enhancement at different frequencies. Further, whilst in one of the described embodiments, a cascaded two filter serial arrangement is used for removing extraneous known signals, it is to be noted that the number of filters could be easily varied and that a cascaded parallel arrangement could equally be used in place of the described serial arrangement, if desired.

It is to be appreciated that the system of the invention finds utility in various frequency/agile or multiple unknown signal applications, as described, as well as in non-agile unknown signal applications. The above described system could be used in various radar communication systems. The system could be used in naval radar communication systems for example, to provide an interference free interface without radar signal masking. The system could also be used in ECM (electronic counter measures) and/or ESM (electronic support measures) applications.

ABBREVIATIONS

BP Bandpass
CW Continuous Wave
ECM Electronic Counter Measures
ESM Electronic Support Measures
(F) FHSS (Fast) Frequency Hopping Spread Spectrum
LP Low Pass
MSW Magnetostatic Wave
PRF Pulse Recurrent Frequency
PW Pulse Width
RF Radio Frequency
Rx Receiver
S/N Signal to Noise Ratio
SNE Signal to Noise Enhancer
Tx Transmitter
YIG Yttrium Iron Garnet

What is claimed is:

1. A method of separating an unknown signal emission from a known interference signal in a system incorporating frequency filter means with controllable frequency converting means, the method comprising the steps of:

(a) receiving and frequency converting a mixed signal at the frequency converting means, which mixed signal comprises a first signal component representative of the unknown signal emission and a second signal component representative of the known interference signal, the first signal component having a single frequency or a plurality of frequencies associated herewith;

(b) stopping a coherent signal component representative of the second signal component at a selected frequency stopband region associated with the frequency filter means;

(c) transmitting an incoherent signal component representative of the received first signal component through a selected frequency-transparent region associated with the frequency filter means; and (d) reconverting the transmitted incoherent signal component with reference to a predetermined signal so as to restore the unknown signal emission at its said single frequency/said plurality of frequencies.

2. A method as claimed in claim 1, further comprising enhancing the transmitted incoherent signal component to enhance the signal to noise level of the first signal component.

3. A method as claimed in claim 2, wherein the dynamic range of the transmitted incoherent signal component is enhanced by means of signal compression.

4. A method as claimed in claim 2, wherein the dynamic range of the transmitted incoherent signal component is enhanced by means of logarithmic amplification.

5. A method as claimed in claim 2, wherein the transmitted incoherent signal component is enhanced at a predetermined frequency by means of a magnetostatic wave enchancer.

6. A method as claimed in claim 1, wherein the selected frequency stopband region is modified to permit the coherent signal component to be stopped at a pre-determined frequency, enabling the stopband width to be reduced.

7. A method as claimed in claim 1, wherein the mixed signal comprises a radio-frequency continuous wave signal.

8. A method as claimed in claim 1, wherein the mixed signal comprises a radio-frequency pulsed wave signal.

9. A method as claimed in claim 1, wherein the signal separation and/or the signal enhancement are effected at a number of different frequencies by means of frequency conversion.

10. A method as claimed in claim 1, wherein the restored unknown signal emission is monitored in real time to permit a signal characterization in dependence thereon.

11. A signal separating system adapted and arranged to carry out a method as claimed in claim 1.

12. A signal separating system for separating an unknown signal emission from a known interference signal, the system comprising:

means for receiving and frequency converting a mixed signal, which mixed signal comprises a first signal component representative of the unknown signal emission and a second signal component representative of the known interference signal, the first signal component having a single frequency or a plurality of frequencies associated herewith;

means for stopping a coherent signal component representative of the second signal component at a selected frequency stopband region of the system;

means for transmitting an incoherent signal component representative of the first signal component through a selected frequency transparent region of the system; and means for reconverting the transmitted incoherent signal component with reference to a predetermined signal so as to restore the unknown signal emission at its said single frequency/said plurality of frequencies.

13. A signal separating system as claimed in claim 12 further comprising signal enhancement means to enhance the transmitted incoherent signal component.

14. A signal separating system as claimed in claim 13 wherein the signal enhancement means comprises a magnetostatic wave enhancer.

15. A signal separating system as claimed in claim 12, incorporating a Gadolinium Gallium Garnet substrate device.

16. A signal separating system as claimed in claim 12, including a number of components arranged in parallel or serial cascades so as to remove extraneous known signals, multi-carrier known signals for example, from the system.

17. A signal separating system as claimed in claim 12, adapted and arranged for application to frequency-agile, multiple and/or non-agile unknown signals.

18. A radar system incorporating a signal separating system as claimed in claim 12.

* * * * *